(12) United States Patent
Li et al.

(10) Patent No.: US 11,679,752 B2
(45) Date of Patent: Jun. 20, 2023

(54) METHOD OF SUPERVISORY CONTROL FOR POWER MANAGEMENT OF A PARALLEL TWO MOTOR HYBRID POWERTRAIN

(71) Applicants: Meng Li, Lake Orion, MI (US); Yang Liang, Troy, MI (US)

(72) Inventors: Meng Li, Lake Orion, MI (US); Yang Liang, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 190 days.

(21) Appl. No.: 17/128,594

(22) Filed: Dec. 21, 2020

(65) Prior Publication Data

US 2022/0194354 A1 Jun. 23, 2022

(51) Int. Cl.

| | |
|---|---|
| *B60W 20/13* | (2016.01) |
| *B60W 10/06* | (2006.01) |
| *B60W 10/10* | (2012.01) |
| *B60W 10/26* | (2006.01) |
| *B60W 10/08* | (2006.01) |
| *F02N 11/08* | (2006.01) |
| *B60W 30/18* | (2012.01) |
| *B60W 10/02* | (2006.01) |

(52) U.S. Cl.
CPC ............ *B60W 20/13* (2016.01); *B60W 10/02* (2013.01); *B60W 10/06* (2013.01); *B60W 10/08* (2013.01); *B60W 10/10* (2013.01); *B60W 10/26* (2013.01); *B60W 30/18027* (2013.01); *F02N 11/0859* (2013.01); *B60W 2510/0666* (2013.01); *B60W 2510/085* (2013.01); *B60W 2510/244* (2013.01)

(58) Field of Classification Search
CPC ...... B60W 10/02; B60W 10/06; B60W 10/08; B60W 10/10; B60W 10/26; B60W 20/13; B60W 2510/0666; B60W 2510/085; B60W 2510/244; B60W 50/082
See application file for complete search history.

(56) References Cited

U.S. PATENT DOCUMENTS

| | | |
|---|---|---|
| 5,495,912 A | 3/1996 | Gray, Jr. et al. |
| 5,643,119 A | 7/1997 | Yamaguchi et al. |
| 5,713,425 A | 2/1998 | Buschhaus et al. |

(Continued)

OTHER PUBLICATIONS

Higuchi, Naritomo, et al., "Efficiency Enhancement of a New Two-Motor Hybrid System", World Electric Vehicle Journal vol. 6, 2013. 11 pages.

(Continued)

*Primary Examiner* — Carl C Staubach
(74) *Attorney, Agent, or Firm* — Ralph E. Smith

(57) ABSTRACT

A hybrid electric vehicle and method of its control include a parallel hybrid powertrain including an engine, a transmission, a battery system, a first electric motor coupled to the engine by a first clutch between the engine and the first electric motor, a second electric motor coupled to the transmission and to the first electric motor by a second clutch between the first and second electric motors, and a controller configured to control the parallel hybrid powertrain for optimal operation across a plurality of different propulsion and charging modes, including calculating cost values for each of the engine and the first and second electric motors and selecting optimal propulsion and charging modes based on the calculated cost values.

16 Claims, 4 Drawing Sheets

(56) References Cited

U.S. PATENT DOCUMENTS

| | | | |
|---|---|---|---|
| 6,026,921 A * | 2/2000 | Aoyama | B60W 10/02 |
| | | | 903/918 |
| 6,164,400 A | 12/2000 | Jankovic et al. | |
| 6,364,807 B1 | 4/2002 | Koneda et al. | |
| 7,360,615 B2 * | 4/2008 | Salman | B60W 10/26 |
| | | | 180/65.265 |
| 7,537,542 B2 | 5/2009 | Cawthorne et al. | |
| 7,568,994 B2 * | 8/2009 | Heap | F16H 3/728 |
| | | | 477/3 |
| 7,991,519 B2 * | 8/2011 | Snyder | B60W 20/30 |
| | | | 701/99 |
| 8,758,192 B2 | 6/2014 | Smith et al. | |
| 10,543,748 B2 | 1/2020 | Duhaime et al. | |
| 2002/0123836 A1 * | 9/2002 | Komiyama | B60W 10/04 |
| | | | 180/65.245 |
| 2015/0099605 A1 * | 4/2015 | Choi | B60W 20/40 |
| | | | 180/65.265 |
| 2020/0391721 A1 * | 12/2020 | Wang | B60W 10/06 |
| 2021/0245607 A1 * | 8/2021 | Zhang | B60L 15/2045 |

OTHER PUBLICATIONS

Hofman, Theo, et al., "Rule-based energy management strategies for hybrid vehicles", Department of Mechanical Engineering. Int. J. Electric and Hybrid Vehicles, vol. 1, No. 1, 2007. 24 pages.

* cited by examiner

| State | Power Mode | Charge | Shift | Powertrain Mode | | | | | | |
|---|---|---|---|---|---|---|---|---|---|---|
| | | | | Drive Mode | Engine | P1R Motor | P2 Motor | K0 Clutch | K1 Clutch |
| 1 | ICE | / | Optimal Gear | Drive | Power on | Power off | Power off | Close | Close |
| 2 | EV | CD | | Drive | Power off | Power on | Power off | Open | Close |
| 3 | EV | CD | | Drive | Power off | Power off | Power on | Open | Open |
| 4 | HEV | CS | | Drive | Power on | Charge | Power off | Close | Close |
| 5 | HEV | CS | | Drive | Power on | Power off | Charge | Close | Close |
| 6 | HEV | CD | | Drive | Power on | Charge | Power on | Close | Close |
| 7 | HEV | CD | | Drive | Power on | Power on | Power off | Close | Close |
| 8 | HEV | CD | | Drive | Power on | Power on | Power on | Close | Close |
| 9 | HEV | CD | | Drive | Power on | Power on | Power on | Close | Close |
| 10 | HEV | CS | | Drive | Power on | Charge | Power off | Close | Close |
| 11 | HEV | CS | | Drive | Power on | Charge | Power on | Close | Close |
| 12 | / | / | | Coast | Power off | Power off | Power off | Open | Open |
| 13 | / | Charge | | Regen | Power off | Power off | Charge | Close | Open |
| 14 | / | Charge | | Regen | Power off | Charge | Power off | Close | Open |
| 15 | / | Charge | | Regen | Power off | Charge | Charge | Close | Open |

FIG. 2

METHOD OF SUPERVISORY CONTROL FOR POWER MANAGEMENT OF A PARALLEL TWO MOTOR HYBRID POWERTRAIN

FIELD

The present application generally relates to hybrid vehicle powertrain control and, more particularly, to supervisory control techniques for power management of a parallel two motor hybrid powertrain.

BACKGROUND

A hybrid electric vehicle (HEV) typically includes a powertrain comprising an engine and at least one electric motor. For example, the electric motor could be integrated into a transmission of the powertrain, which is also known as a "hybrid transmission." An HEV could also have multiple electric motors. As the hybrid powertrain becomes more complex, power management and optimization (i.e., performance vs. cost) across all possible driving modes (charge depleting, charge sustaining, etc.) is a difficult/complex task. Thus, while such conventional hybrid vehicle powertrain control systems do work well for their intended purpose, there remains a desire for improvement in the relevant art.

SUMMARY

According to one example aspect of the invention, a hybrid electric vehicle is presented. In one exemplary implementation, the hybrid electric vehicle comprises a parallel hybrid powertrain comprising an engine, a transmission, a battery system, a first electric motor coupled to the engine by a first clutch between the engine and the first electric motor, a second electric motor coupled to the transmission and to the first electric motor by a second clutch between the first and second electric motors, and a controller configured to control the parallel hybrid powertrain for optimal operation across a plurality of different propulsion and charging modes, including calculating cost values for each of the engine and the first and second electric motors and selecting optimal propulsion and charging modes based on the calculated cost values.

In some implementations, the controller is configured to execute a launch procedure whereby the vehicle is launched using only the second electric motor for propulsive torque. In some implementations, the launch procedure further comprises the controller speed matching the engine with at least one of the first and second electric motors. In some implementations, the controller is further configured to control the parallel hybrid powertrain to operate in a charge sustaining mode or a charge depletion mode for the battery system.

In some implementations, the controller is configured to determine a minimum cost value min(J) using the following equation:

$$\min(J) = \int_0^t E_{ICE} + f_{pen} E_{battery} + F_{ICE\_control} + F_{ICE\_StartStop} + F_{shift} + F_{thermal} \, dt$$

where $E_{ICE}$ is a fuel consumption rate of the engine, $E_{battery}$ is a total electricity power change of the battery system, $f_{pen}$ is a multiplier penalty factor used to tune the weight of the electricity power change, $F_{ICE\_control}$ is a penalty function as torque change rate to consider a controllability of engine torque, $F_{ICE\_StartStop}$ is a penalty function to consider a drivability cost of engine start-stop, $F_{shift}$ is a penalty function to consider a drivability cost of a transmission shift, and $F_{thermal}$ is a penalty function to consider thermal states of the parallel hybrid powertrain to avoid overheating.

In some implementations, optimization of the minimum cost function equation is subject to the following constraints:

$$P_{pwt} = P_{demand}$$

$$0 \leq P_{ICE} \leq P_{ICE\_max}$$

$$P_{P1R\_min} \leq P_{P1R} \leq P_{P1R\_max}$$

$$P_{P2\_min} \leq P_{P2} \leq P_{P2\_max}$$

$$SOC_{min} \leq SOC \leq SOC_{max}$$

$$I_{min} \leq I \leq I_{max}$$

$$T_{pwt\_min} \leq T_{pwt} \leq T_{pwt\_max}$$

where $P_{pwt}$ is a total powertrain propulsion power, $P_{demand}$ is a driver's power demand, $P_{ICE}$ is an engine power determined by supervisory power management, $P_{ICE\_max}$ is a maximum engine power at the given operation conditions, $P_{P1R\_min}$ and $P_{P1R\_max}$ are maximum first electric motor charging and driving powers at the given operation conditions, respectively, $P_{P2\_min}$ and $P_{P2\_max}$ are the maximum second electric motor charging and driving powers at the given operation conditions, respectively, SOC is the battery system state of charge relative lower and upper bounds $SOC_{min}$ and $SOC_{max}$, respectively, I is the battery system charge and discharge current relative to lower and upper bounds $I_{min}$ and $I_{max}$, respectively, and $T_{pwt}$ is the powertrain torque relative to lower and upper bounds $T_{pwt\_min}$ and $T_{pwt\_max}$, respectively.

In some implementations, the transmission does not include a torque converter. In some implementations, the controller is configured to start the engine using the first electric motor. In some implementations, the engine does not include a starter.

According to another example aspect of the invention, a method of optimally controlling a parallel hybrid powertrain of a hybrid electric vehicle is presented. In one exemplary implementation, the method comprises providing the parallel hybrid powertrain, the parallel hybrid powertrain comprising an engine, a transmission, a battery system, a first electric motor coupled to the engine by a first clutch between the engine and the first electric motor, a second electric motor coupled to the transmission and to the first electric motor by a second clutch between the first and second electric motors, and controlling, by a controller of the hybrid electric vehicle, the parallel hybrid powertrain for optimal operation across a plurality of different propulsion and charging modes, including calculating cost values for each of the engine and the first and second electric motors and selecting optimal propulsion and charging modes based on the calculated cost values.

In some implementations, the method further comprises executing, by the controller, a launch procedure whereby the vehicle is launched using only the second electric motor for propulsive torque. In some implementations, the launch procedure further comprises speed matching, by the controller, the engine with at least one of the first and second electric motors. In some implementations, the method further comprises controlling, by the controller, the parallel hybrid powertrain to operate in a charge sustaining mode or a charge depletion mode for the battery system.

In some implementations, the method further comprises determining, by the controller, a minimum cost value min(J) using the following equation:

$$\min(J) = \int_0^t E_{ICE} + f_{pen} E_{battery} + F_{ICE\_control} + F_{ICE\_StartStop} + F_{shift} + F_{thermal} \, dt$$

where $E_{ICE}$ is a fuel consumption rate of the engine, $E_{battery}$ is a total electricity power change of the battery system, $f_{pen}$ is a multiplier penalty factor used to tune the weight of the electricity power change, $F_{ICE\_control}$ is a penalty function as torque change rate to consider a controllability of engine torque, $F_{ICE\_StartStop}$ is a penalty function to consider a drivability cost of engine start-stop, $F_{shift}$ is a penalty function to consider a drivability cost of a transmission shift, and $F_{thermal}$ is a penalty function to consider thermal states of the parallel hybrid powertrain to avoid overheating.

In some implementations, optimization of the minimum cost function equation is subject to the following constraints:

$$P_{pwt} = P_{demand}$$

$$0 \leq P_{ICE} \leq P_{ICE\_max}$$

$$P_{P1R\_min} \leq P_{P1R} \leq P_{P1R\_max}$$

$$P_{P2\_min} \leq P_{P2} \leq P_{P2\_max}$$

$$SOC_{min} \leq SOC \leq SOC_{max}$$

$$I_{min} \leq I \leq I_{max}$$

$$T_{pwt\_min} \leq T_{pwt} \leq T_{pwt\_max}$$

where $P_{pwt}$ is a total powertrain propulsion power, $P_{demand}$ is a driver's power demand, $P_{ICE}$ is an engine power determined by supervisory power management, $P_{ICE\_max}$ is a maximum engine power at the given operation conditions, $P_{P1R\_min}$ and $P_{P1R\_max}$ are maximum first electric motor charging and driving powers at the given operation conditions, respectively, $P_{P2\_min}$ and $P_{P2\_max}$ are the maximum second electric motor charging and driving powers at the given operation conditions, respectively, SOC is the battery system state of charge relative lower and upper bounds $SOC_{min}$ and $SOC_{max}$, respectively, I is the battery system charge and discharge current relative to lower and upper bounds $I_{min}$ and $I_{max}$, respectively, and $T_{pwt}$ is the powertrain torque relative to lower and upper bounds $T_{pwt\_min}$ and $T_{pwt\_max}$, respectively.

In some implementations, the transmission does not include a torque converter. In some implementations, the method further comprises starting, by the controller, the engine using the first electric motor. In some implementations, the engine does not include a starter.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a table of example operating modes of the parallel hybrid powertrain including different propulsion and charging modes according to the principles of the present disclosure;

DESCRIPTION

As previously mentioned, there remains a desire for improvement in the art of hybrid electric vehicle (HEV) powertrain control systems. Accordingly, improved HEV powertrain control systems and methods are presented. These systems and methods are specific to a parallel HEV powertrain configuration in which there are multiple electric motors in addition to an engine that could be providing propulsive torque to a driveline of the HEV. It will be appreciated that the terms "parallel hybrid powertrain" and "parallel HEV powertrain" are both be used herein to describe the vehicle's powertrain configuration. The systems and methods control the parallel hybrid powertrain for optimal operation across a plurality of different propulsion and charging modes (charge sustaining, charge depletion, etc.). These control schemes and the parallel hybrid powertrain configuration also provide for starting the engine with an electric motor instead of a starter and for launching the vehicle with one or two electric motors and not the engine (also referred to as an "zero emissions launch"). Potential benefits include increased efficiency (e.g., fuel economy) and decreased costs due to the elimination of a conventional starter and a torque converter for the transmission.

Figure 1:
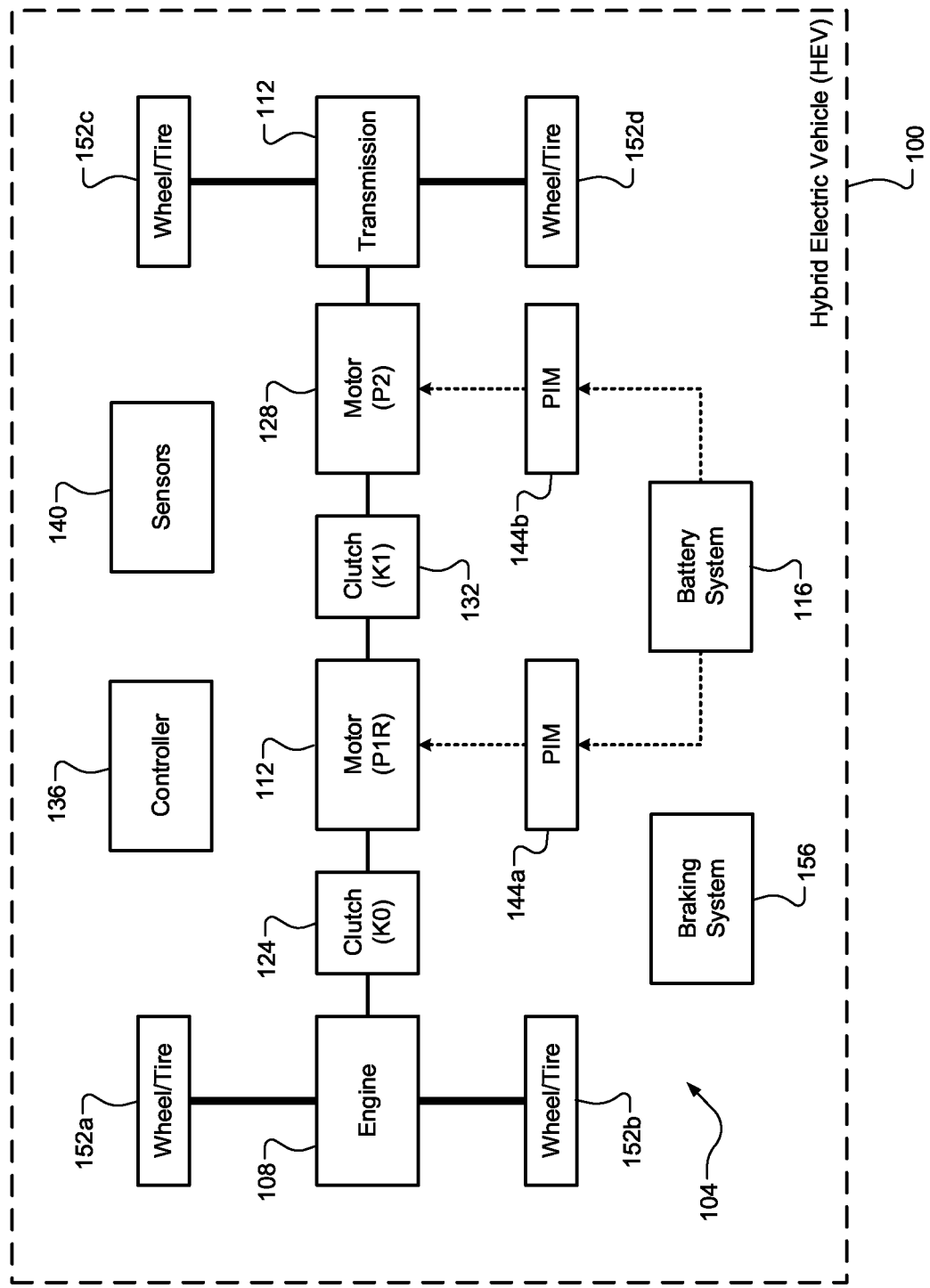
FIG. 1 is a diagram of an example hybrid electric vehicle (HEV) comprising a parallel hybrid powertrain according to the principles of the present disclosure.

Referring now to FIG. 1, a diagram of an example HEV 100 is illustrated. The HEV 100 includes a parallel hybrid powertrain 104 comprising an engine 108, a transmission 112, a battery system 116, a first electric motor 120 (P1R) coupled to the engine 108 by a first clutch 124 (K0) between the engine 108 and the first electric motor 120, a second electric motor 128 (P2) coupled to the transmission 112 and to the first electric motor 120 (P1R) by a second clutch 132 (K1) between the first and second electric motors 120, 128. The HEV 100 also comprises a controller 136 configured to control the parallel hybrid powertrain 104 for optimal operation across a plurality of different propulsion and charging modes based on specific algorithms and inputs from a set of sensors 140. It will be appreciated that the HEV 100 could also include other components, such as first and second power inverter modules (PIMS) 144a, 144b for the first and second electric motors 120, 128, as well as driveline components such as front and rear axles 148a, 148b, four wheels/tires 152a-152d, and a braking system 156 and differentials and/or transfer cases (not shown) between the engine 108 and front axle 148a and/or between the transmission 112 and rear axle 148b.

As previously mentioned, potential benefits of the parallel hybrid powertrain 104 include the elimination of a conventional engine starter and a conventional transmission torque converter. More specifically, the first electric motor 120 (P1R) is configured to start the engine 108, and the second electric motor 128 (P2) is configured to speed synchronization with the transmission 112. Non-limiting examples of the set of sensors 140 or other known parameters used by the controller for optimal control (e.g., power management or maximization) of the parallel hybrid powertrain include: a power demand sensor, a transmission control module (TCM) shift command, a TCM launch command, an engine control unit (ECU) engine control signal, a battery management system (BMS) battery system state signal, a braking control signal, and a powertrain temperature sensor. It will be appreciated that the TCM, the ECU, and the BMS could all be part of the controller 136, or that these components could be separate controllers of sub-controllers of the parallel hybrid powertrain 104.

Referring now to FIG. 2 and with continued reference to FIG. 1, a table 200 illustrating example operating modes of the parallel hybrid powertrain 104 including different propulsion and charging modes is illustrated. As shown, there are 15 different operating modes, including different propulsion modes (internal combustion engine (ICE) only, electric motor(s) only (EV), engine and electric motor(s) (HEV), and no propulsion (/)), different battery system charging modes (none/off (/), charge depletion (CD), charge sustaining (CS), and charging (Charge)), and different drive modes (Drive, Coast, and Regen). The Regen drive mode refers to regenerative braking, whereby energy of the braking system 156 is captured to enable recharging of the battery system 116. For each of these 15 different operating modes, the specific states of each of the engine 108, the electric motors 120, 128, and the clutches 124, 132 are also specifically illustrated. The specific algorithms employed by the controller 136 to determine which of these operating modes to select and enable at a given time for optimal power management will now be discussed in greater detail with reference to FIG. 3.

Figure 3:
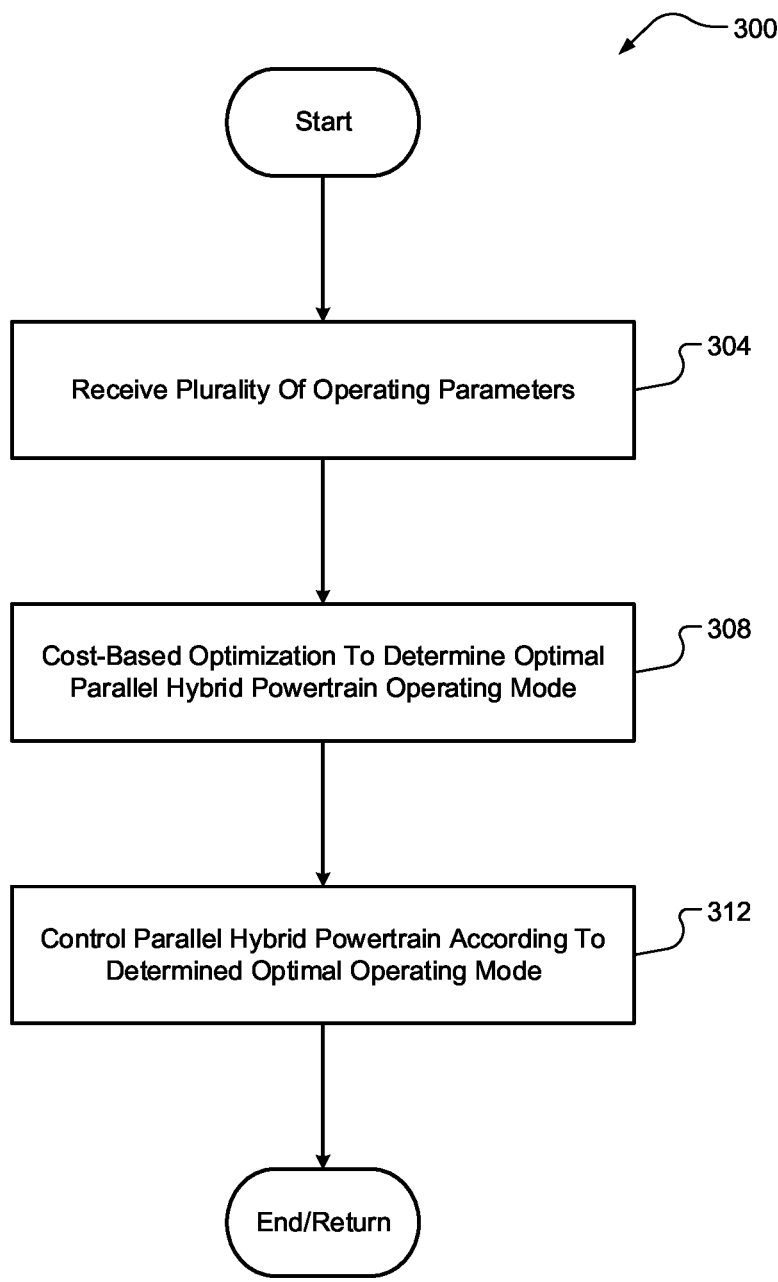
FIG. 3 is a flow diagram of an example method of vehicle parallel hybrid powertrain control for optimal power management according to the principles of the present disclosure.

Referring now to FIG. 3 and with continued reference to FIGS. 1-2, a flow diagram of an example method of vehicle parallel hybrid powertrain control for optimal power management according to the principles of the present disclosure is illustrated. At 304, the controller 136 receives a plurality of parameters each relating to optimal power management, which could include signal(s) from the set of sensors 140. It will be appreciated that some parameters could be sensed whereas other parameters could already be known by the controller 136 or provided thereto from another vehicle controller/system. At 308, the controller 136 determines an optimal operating mode for the parallel hybrid powertrain 104 based on the plurality of parameters. In one exemplary implementation, the optimal control is to achieve the most appropriate trade-off among multiple considerations of powertrain control and, more particularly, good fuel economy and high drivability. For example, this could include determining the minimum cost value of an objective function. At 312, the controller 136 controls the parallel hybrid powertrain 104 based on the selected optimal operating mode and the method 300 ends or returns to 304 for one or more additional cycles.

In one exemplary implementation, the objective function for determining the minimum cost value min(J) is defined as follows:

$$\min(J) = \int_0^t E_{ICE} + f_{pen} E_{battery} + F_{ICE\_control} + F_{ICE\_StartStop} + F_{shift} + F_{thermal} dt$$

where $E_{ICE}$ is the fuel consumption rate of the engine 108, $E_{battery}$ is the total electricity power change of the battery system 116, $f_{pen}$ is a multiplier penalty factor used to tune the weight of the electricity power change in the cost function, $F_{ICE\_control}$ is a penalty function as torque change rate to consider the controllability of engine torque, $F_{ICE\_StartStop}$ is a penalty function to consider the drivability cost of engine start-stop, $F_{shift}$ is a penalty function to consider the drivability cost of a transmission shift, and $F_{thermal}$ is a penalty function to consider the thermal states of the powertrain 104 to avoid overheating.

Under each feasible operation state, the cost function is evaluated for the available adjacent gear states of upper two gears and lower two gears. The optimal control results are obtained with a minimum solution in the set of all the states comprising combination of power states and gear states. The penalty factor $f_{pen}$ is used to set the weight on electrification system power management at hybrid mode. Appropriate value of the penalty factor $f_{pen}$ would maintain the battery system state of charge (SOC) within appropriate range from beginning to the end of the driving cycle, and realize high powertrain efficiency through motor charge and discharge. To determine the optimal penalty factor, the HEV 100 could be tested with different driving cycles and varied penalty factors. In real driving conditions, the penalty factor could then be chosen from the one resulting in best performance for the driving pattern closest to the test, which is an online adaptation and auto-tuning process.

In one exemplary implementation, the optimization is subject to the following constraints:

$$P_{pwt} = P_{demand}$$

$$0 \leq P_{ICE} \leq P_{ICE\_max}$$

$$P_{P1R\_min} \leq P_{P1R} \leq P_{P1R\_max}$$

$$P_{P2\_min} \leq P_{P2} \leq P_{P2\_max}$$

$$SOC_{min} \leq SOC \leq SOC_{max}$$

$$I_{min} \leq I \leq I_{max}$$

$$T_{pwt\_min} \leq T_{pwt} \leq T_{pwt\_max}$$

where $P_{pwt}$ is the total powertrain propulsion power, $P_{demand}$ is the driver's power demand, $P_{ICE}$ is the engine power determined by supervisory power management, $P_{ICE\_max}$ is the maximum engine power at the given operation conditions, $P_{P1R\_min}$ and $P_{P1R\_max}$ are the maximum P1R motor charging and driving powers at the given operation conditions, respectively, $P_{P2\_min}$ and $P_{P2\_max}$ are the maximum P2 motor charging and driving powers at the given operation conditions, respectively, SOC is the battery system state of charge relative lower and upper bounds $SOC_{min}$ and $SOC_{max}$, respectively, I is the battery system charge and discharge current relative to lower and upper bounds $I_{min}$ and $I_{max}$, respectively, and $T_{pwt}$ is the powertrain torque relative to lower and upper bounds $T_{pwt\_min}$ and $T_{pwt\_max}$, respectively.

Apart from the fuel consumption to be accounted for the engine 108, the effect of start-stop operation on drivability and engine torque controllability are incorporated in the cost that involves engine operation. When the engine torque command is zero from supervisory power management optimization, controller 136 would determine whether to continue to run the engine 108 at idle conditions to charge, or to cut off the fuel supply with $F_{ICE\_StartStop}$ in the cost function. To determine the gear states, the current controller 136 adopts a rule-based shift logic. At all times, the supervisory power management system would compute the total cost at current gear state GEAR and the adjacent two upper (GEAR+1, GEAR-i-2) and lower gears (GEAR-i, GEAR-2), if available and feasible. When the driver's power demand changes, the controller 136 would decide if shift to another gear would reduce the fuel consumption. Moreover, the adverse effect on drivability performance induced by gear shift is evaluated with a powertrain dynamics model. By using a cost function for drivability reduction, the supervisory control would strike a balance between fuel economy and driving comfort to decide if shift action should be taken.

As expected, electric mode is most power-efficient among all the operation states. The parallel hybrid powertrain would run at electric only (EV) mode as long as the electrification system works appropriately and the battery state of charge (SOC) is high or satisfies a threshold. In the EV mode, it is possible to run the two motors 120, 128 with an optimal power split. When both motors 120, 128 operate to propel the HEV 100, clutch 132 is to be engaged. Thus, this clutch 132 (K1) could also be referred to as a launch clutch. If only the second electric motor 128 (P2) is to be run for propulsion, an electric pump (not shown) inside the transmission 112 would pump the transmission fluid to meet the transmission flow or pressure demand of hydraulic actuation, cooling, and lubrication. The total electricity power change $E_{battery}$ of the battery system 116 is determined as follows:

$$E_{battery} = E_{high\_volt} + E_{low\_volt}$$

where $E_{high\_volt}$ is the electric power change induced by the high voltage portion of the powertrain 104 (i.e., the motors 120, 128 and PIMS 144a, 144b) and $E_{low\_volt}$ is electric power consumed by the low voltage components of the powertrain 104 (electric pumps, compressors, heaters, lights, radios, etc.).

When only the first electric motor 120 (P1R) is used to propel the vehicle:

$$E_{high_{volt}} = E_{P1R} + E_{P1R\_PIM}$$

$$P_{P1R} = P_{demand}$$

where $E_{P1R}$ is the electric power change induced by the first electric motor 120 (P1R) charging or driving, $E_{P1R\_PIM}$ is the electric power loss generated by PIM 144a, and $P_{P1R}$ is the propulsion power provided by the first electric motor 120 (P1R). Similarly, when only the second electric motor 128 (P2) is used to propel the HEV 100:

$$E_{high_{volt}} = E_{P2} + E_{P2\_PIM}$$

$$P_{P1R} = P_{demand}$$

where $E_{P2}$ is the electric power change induced by the second electric motor 128 (P2) charging or driving, $E_{P2\_PIM}$ is the electric power loss generated by PIM 144a, and $P_{P2}$ is the propulsion power provided by the second electric motor 128 (P2). Lastly, when both electric motors 120, 128 are used to propel the HEV 100:

$$E_{high_{volt}} = E_{P1R} + E_{P1R\_PIM} + E_{P2} + E_{P2\_PIM}$$

$$P_{P1R} + P_{P2} = P_{demand}$$

with the power split between the motors 120, 128 being optimized with the minimal total powertrain cost.

When battery system SOC drops to a low level that requires motor charging, there are three different operation modes. A first mode is to use engine to propel the HEV 100 while using the second electric motor 128 (P2) as generator to brake appropriate amount of torque for charging. The second mode is to use the second electric motor 128 (P2) for driving and to run the first electric motor 120 (P1R) as generator to provide electricity power through the two PIMS 144a, 144b. The third mode takes place when the HEV 100 is decelerated with motor regeneration. For the first mode, the optimal charge sustaining through engine torque braking is chosen from two different cases of scenarios:

$$E_{high_{volt P1R}} = -E_{P1R} + E_{P1R_{PIM}}$$

$$P_{ICE} - P_{P1R} = P_{demand}$$

and $$E_{high_{volt P1R}} = E_{P1R} + E_{P1R_{PIM}} + E_{P2} + E_{P2\_PIM}$$

$$P_{ICE} - P_{P2} = P_{demand}.$$

For the second mode, the engine 108 could run at a speed independent of the second electric motor 128 (P2), which is mounted on the driveline. This involves disengaging clutch 132, which allows the engine 108 to operate at a high speed and efficiency region. The powertrain power change could be considered as:

$$E_{high\_volt\_P1R} = -E_{P1R} + E_{P1R_{PIM}}$$

$$E_{ICE} = E_{P1R}$$

$$P_{P2} = P_{demand}.$$

The third and final mode (regenerative braking) is achieved with the second electric motor 128 (P2) being used as a generator. Such charging would be very intermittent but it could utilize the free energy during braking. The braking comfort aspect of drivability should be taken into account for braking control with a limited torque. The P2 motor braking control could be performed along with downshift control through the shift drivability consideration $F_{shift}$. The controller torque for P2 motor braking could be determined as follows:

$$T_{P2\_regen} = \min(T_{comf_{brake}}, T_{P2\_max}, T_{brake})$$

where $T_{P2\_regen}$ is the controlled P2 motor braking torque for regeneration, $T_{comf_{brake}}$ is the braking torque limit for deceleration comfort, $T_{P2\_max}$ is the maximum P2 motor braking torque, and $T_{brake}$ is the available braking torque at the input shaft through vehicle deceleration. When a malfunction takes place in the electrification system, the powertrain 104 is capable of driving with the mechanical system only, which is the default mode where clutches 124, 132 (K0, K1) are engaged to translate the power from engine 108 to the driveline.

Figure 4A:
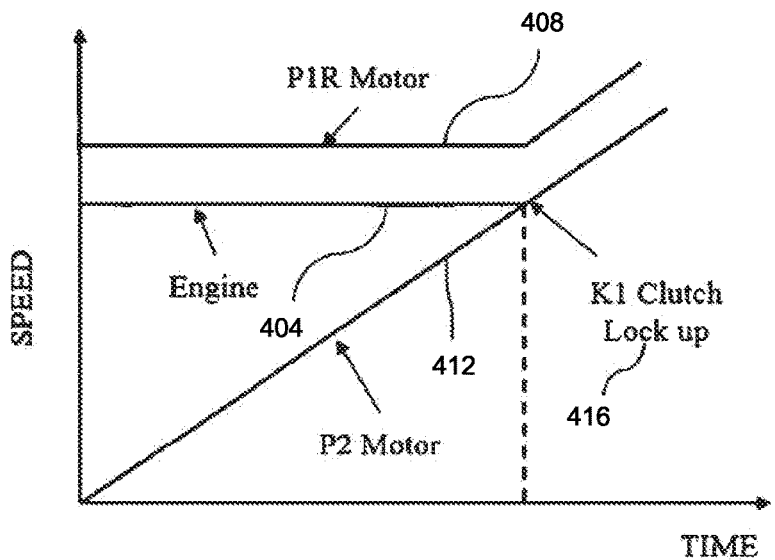
FIGS. 4A-4B are a plot and a flow diagram of an example zero emissions launch control method using the parallel hybrid powertrain configuration according to the principles of the present disclosure.
Figure 4B:
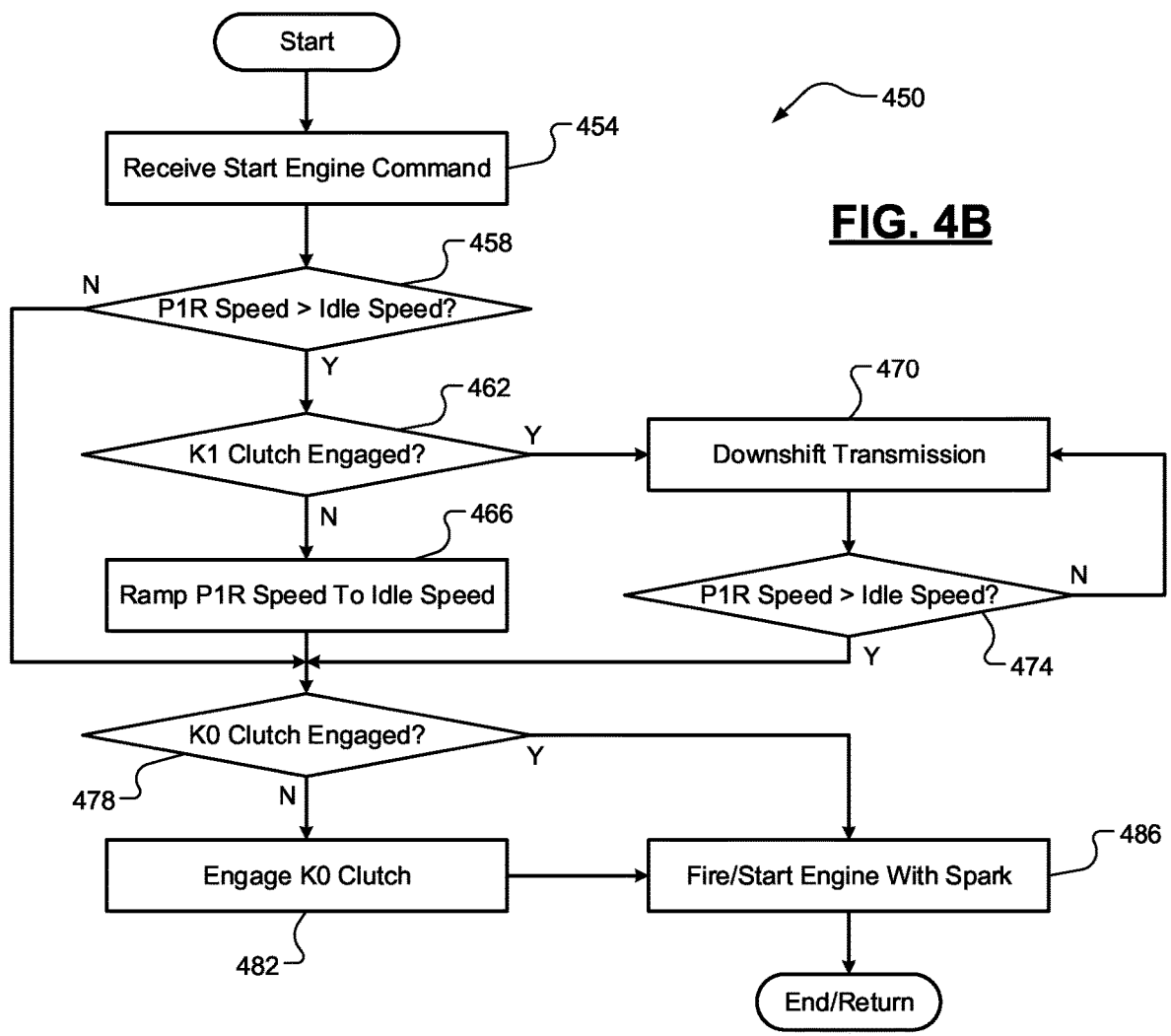

FIGS. 4A-4B illustrate other aspects of the powertrain control scheme of the present disclosure. When the propulsion power demand is high, the engine 104, the first electric motor 120 (P1R), and the second electric motor 128 (P2) could all run together to propel the HEV. When the vehicle starts from zero or low speed, clutch 132 is slipped until the input shaft speed reaches the same speed as engine 104. FIG. 4A plots the speed profiles of the engine 108, the first electric motor 120 (P1R), the second electric motor 128 (P2), and engagement of clutch 132 at an ideal powertrain propulsion condition. Before vehicle launch, the engine is fired with the first electric motor 120 (P1R). Afterwards, clutch 124 (K0) is engaged. The engine 108 runs at constant speed 404 at which the torque capacity is high. The first electric motor 120 (P1R) runs at a speed 308 proportional to the engine speed 404 by a gear ratio. At the driveline on the right hand side of clutch 132 (K2), the speed 412 would gradually increase with the total torque consisting of engine torque, P1R motor torque, and P2 motor torque. Once the left hand side and the right hand side of clutch 132 (K1) are synchronized, clutch 132 (K1) would be locked up at 416 with a zero or near-zero slip speed in the friction pair.

To start engine with spark ignition, the engine crankshaft needs to be ramped up to a target speed for firing without issue. To achieve that, clutch 128 (K0) is to be engaged and the speed of the first electric motor 120 (P1R) is to be ramped up to the same target speed with motor control. FIG. 4B illustrates the steps of clutch and motor control for engine start from electric only or EV mode. When the engine start command is received from the supervisory controller as input signal at 454, P1R motor speed (e.g., acquired by a motor speed sensor of sensors 140) is judged at block 458. When the P1R motor speed exceeds the engine idle speed, the state of clutch K0 is judged at 478. When clutch K0 is not engaged, the hydraulic system is actuated to engage clutch K0 at 482. When P1R motor speed is less than the engine idle speed, the engagement state of clutch K1 is judged at 462. When clutch K1 is not engaged, it indicates P1R motor operation is independent of P2 motor operation and the P1R motor could be directly accelerated to the target speed at 466. When clutch K1 is engaged, that means P1R motor is used to propel vehicle along with P2 motor. The most feasible way to increase P1R motor speed is a transmission downshift at 470. Once P1R reaches the target speed at 474, the engine 108 can be cranked with engaged K0 clutch to fire/start with spark at 486.

As previously discussed, it will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A hybrid electric vehicle, comprising:
    a parallel hybrid powertrain comprising:
        an engine;
        a transmission;
        a battery system;
        a first electric motor coupled to the engine by a first clutch between the engine and the first electric motor;
        a second electric motor coupled to the transmission and to the first electric motor by a second clutch between the first and second electric motors; and
    a controller configured to control the parallel hybrid powertrain for optimal operation across a plurality of different propulsion and charging modes, including calculating cost values for each of the engine and the first and second electric motors and selecting optimal propulsion and charging modes based on a minimum cost value calculated using a minimum cost equation based on the calculated cost values and a set of at least one of penalty factors and penalty functions relating to an electricity power change, a torque change rate, engine start-stop frequency, transmission shift frequency, and thermal states relative to overheating,
    wherein the controller is configured to determine the minimum cost value min(J) using the following equation:

$$\min(J) = \int_0^t E_{ICE} + f_{pen} E_{battery} + F_{ICE\_control} + F_{ICE\_StartStop} + F_{shift} + F_{thermal} dt$$

where $E_{ICE}$ is a fuel consumption rate of the engine, $E_{battery}$ is a total electricity power change of the battery system, $f_{pen}$ is a multiplier penalty factor used to tune the weight of the electricity power change, $F_{ICE\_control}$ is a penalty function as torque change rate to consider a controllability of engine torque, $F_{ICE\_StartStop}$ is a penalty function to consider a drivability cost of engine start-stop, $F_{shift}$ is a penalty function to consider a drivability cost of a transmission shift, and $F_{thermal}$ is a penalty function to consider thermal states of the parallel hybrid powertrain to avoid overheating.

2. The hybrid electric vehicle of claim 1, wherein the controller is configured to execute a launch procedure whereby the vehicle is launched using only the second electric motor for propulsive torque.

3. The hybrid electric vehicle of claim 2, wherein the launch procedure further comprises the controller speed matching the engine with at least one of the first and second electric motors.

4. The hybrid electric vehicle of claim 1, wherein the controller is further configured to control the parallel hybrid powertrain to operate in a charge sustaining mode or a charge depletion mode for the battery system.

5. The hybrid electric vehicle of claim 1, wherein optimization of the minimum cost function equation is subject to the following constraints:

$$P_{pwt} = P_{demand}$$

$$0 \leq P_{ICE} \leq P_{ICE\_max}$$

$$P_{P1R\_min} \leq P_{P1R} \leq P_{P1R\_max}$$

$$P_{P2\_min} \leq P_{P2} \leq P_{P2\_max}$$

$$SOC_{min} \leq SOC \leq SOC_{max}$$

$$I_{min} \leq I \leq I_{max}$$

$$T_{pwt\_min} \leq T_{pwt} \leq T_{pwt\_max}$$

where $P_{pwt}$ is a total powertrain propulsion power, $P_{demand}$ is a driver's power demand, constraints on the engine fuel consumption rate $E_{ICE}$ include (i) $P_{ICE}$, an engine power determined by supervisory power management and (ii) $P_{ICE\_max}$, a maximum engine power at the given operation conditions, constraints on the battery system total electricity power change include (i) $P_{P1R\_min}$ and $P_{P1R\_max}$, maximum first electric motor charging and driving powers at the given operation conditions, respectively, (ii) $P_{P2\_min}$ and $P_{P2\_max}$, the maximum second electric motor charging and driving powers at the given operation conditions, respectively, (iii) SOC, the battery system state of charge relative lower and upper bounds $SOC_{min}$ and $SOC_{max}$, respectively, and (iv) I, the battery system charge and discharge current relative to lower and upper bounds $I_{min}$ and $I_{max}$, respectively, and $T_{pwt}$ is the powertrain torque relative to lower and upper bounds $T_{pwt\_min}$ and $T_{pwt\_max}$, respectively.

6. The hybrid electric vehicle of claim 1, wherein the transmission does not include a torque converter.

7. The hybrid electric vehicle of claim 1, wherein the controller is configured to start the engine using the first electric motor.

8. The hybrid electric vehicle of claim 7, wherein the engine does not include a starter.

9. A method of optimally controlling a parallel hybrid powertrain of a hybrid electric vehicle, the method comprising:
providing the parallel hybrid powertrain, the parallel hybrid powertrain comprising:
an engine;
a transmission;
a battery system;
a first electric motor coupled to the engine by a first clutch between the engine and the first electric motor;
a second electric motor coupled to the transmission and to the first electric motor by a second clutch between the first and second electric motors;
controlling, by a controller of the hybrid electric vehicle, the parallel hybrid powertrain for optimal operation across a plurality of different propulsion and charging modes, including calculating cost values for each of the engine and the first and second electric motors and selecting optimal propulsion and charging modes based on a minimum cost value calculated using a minimum cost equation based on the calculated cost values and a set of at least one of penalty factors and penalty functions relating to an electricity power change, a torque change rate, engine start-stop frequency, transmission shift frequency, and thermal states relative to overheating; and
determining, by the controller, the minimum cost value min(J) using the following equation:

$$\min(J) = \int_0^t E_{ICE} + f_{pen} E_{battery} + F_{ICE\_control} + F_{ICE\_StartStop} + F_{shift} + F_{thermal} \, dt$$

where $E_{ICE}$ is a fuel consumption rate of the engine, $E_{battery}$ is a total electricity power change of the battery system, $f_{pen}$ is a multiplier penalty factor used to tune the weight of the electricity power change, $F_{ICE\_control}$ is a penalty function as torque change rate to consider a controllability of engine torque, $F_{ICE\_StartStop}$ is a penalty function to consider a drivability cost of engine start-stop, $F_{shift}$ is a penalty function to consider a drivability cost of a transmission shift, and $F_{thermal}$ is a penalty function to consider thermal states of the parallel hybrid powertrain to avoid overheating.

10. The method of claim 9, further comprising executing, by the controller, a launch procedure whereby the vehicle is launched using only the second electric motor for propulsive torque.

11. The method of claim 10, wherein the launch procedure further comprises speed matching, by the controller, the engine with at least one of the first and second electric motors.

12. The method of claim 9, further comprising controlling, by the controller, the parallel hybrid powertrain to operate in a charge sustaining mode or a charge depletion mode for the battery system.

13. The method of claim 9, wherein optimization of the minimum cost function equation is subject to the following constraints:

$$P_{pwt} = P_{demand}$$

$$0 \leq P_{ICE} \leq P_{ICE\_max}$$

$$P_{P1R\_min} \leq P_{P1R} \leq P_{P1R\_max}$$

$$P_{P2\_min} \leq P_{P2} \leq P_{P2\_max}$$

$$SOC_{min} \leq SOC \leq SOC_{max}$$

$$I_{min} \leq I \leq I_{max}$$

$$T_{pwt\_min} \leq T_{pwt} \leq T_{pwt\_max}$$

where $P_{pwt}$ is a total powertrain propulsion power, $P_{demand}$ is a driver's power demand, constraints on the engine fuel consumption rate $E_{ICE}$ include (i) $P_{ICE}$, an engine power determined by supervisory power management and (ii) $P_{ICE\_max}$, a maximum engine power at the given operation conditions, constraints on the battery system total electricity power change include (i) $P_{P1R\_min}$ and $P_{P1R\_max}$, maximum first electric motor charging and driving powers at the given operation conditions, respectively, (ii) $P_{P2\_min}$ and $P_{P2\_max}$, the maximum second electric motor charging and driving powers at the given operation conditions, respectively, (iii) SOC, the battery system state of charge relative lower and upper bounds $SOC_{min}$ and $SOC_{max}$, respectively, and (iv) I, the battery system charge and discharge current relative to lower and upper bounds $I_{min}$ and $I_{max}$, respectively, and $T_{pwt}$ is the powertrain torque relative to lower and upper bounds $T_{pwt\_min}$ and $T_{pwt\_max}$, respectively.

14. The method of claim 9, wherein the transmission does not include a torque converter.

15. The method of claim 9, further comprising starting, by the controller, the engine using the first electric motor.

16. The method of claim 15, wherein the engine does not include a starter.

* * * * *